July 23, 1957
M. J. CORBETT
2,800,020
FLOWMETER
Filed April 30, 1954
2 Sheets-Sheet 2
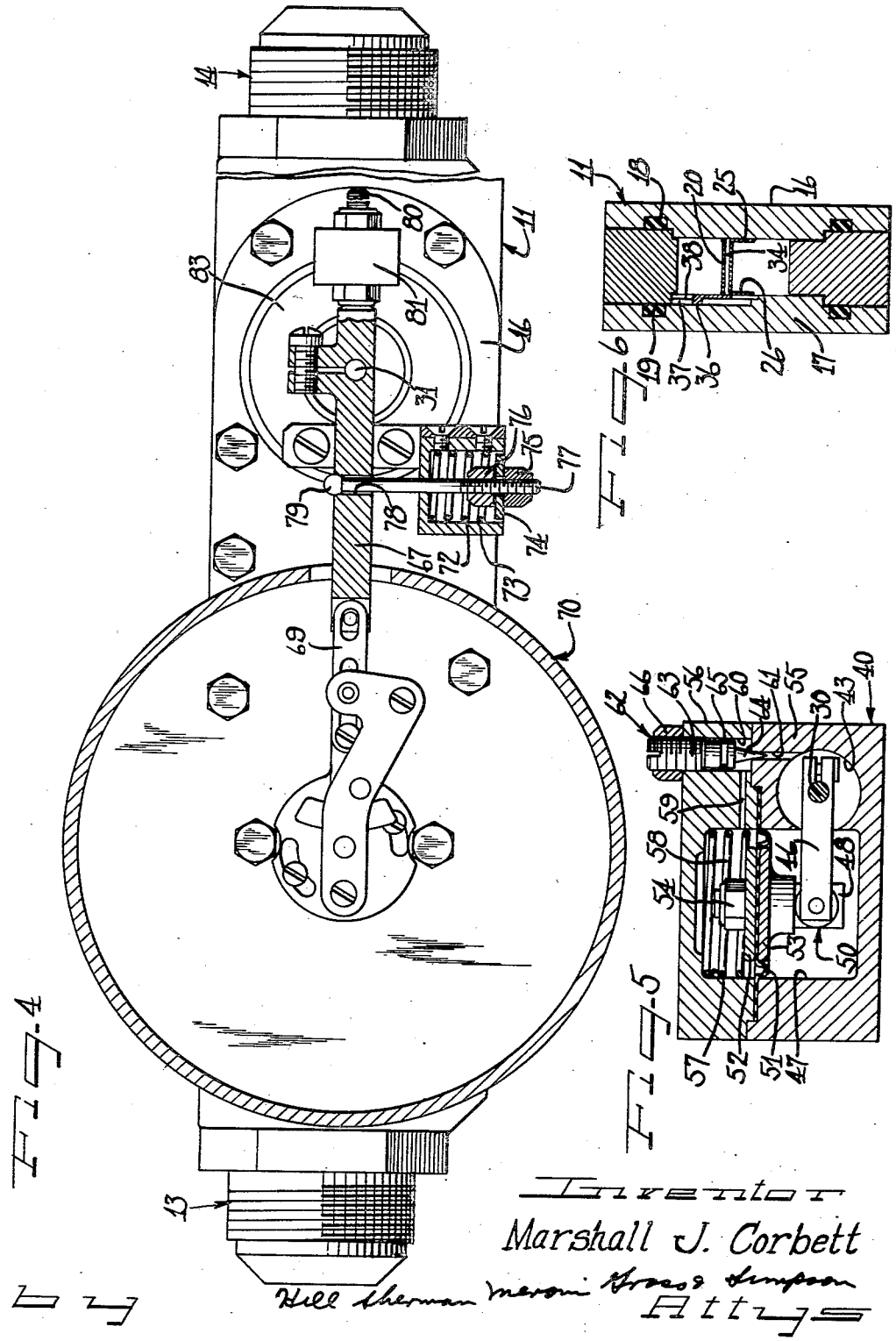
Inventor
Marshall J. Corbett
Attys

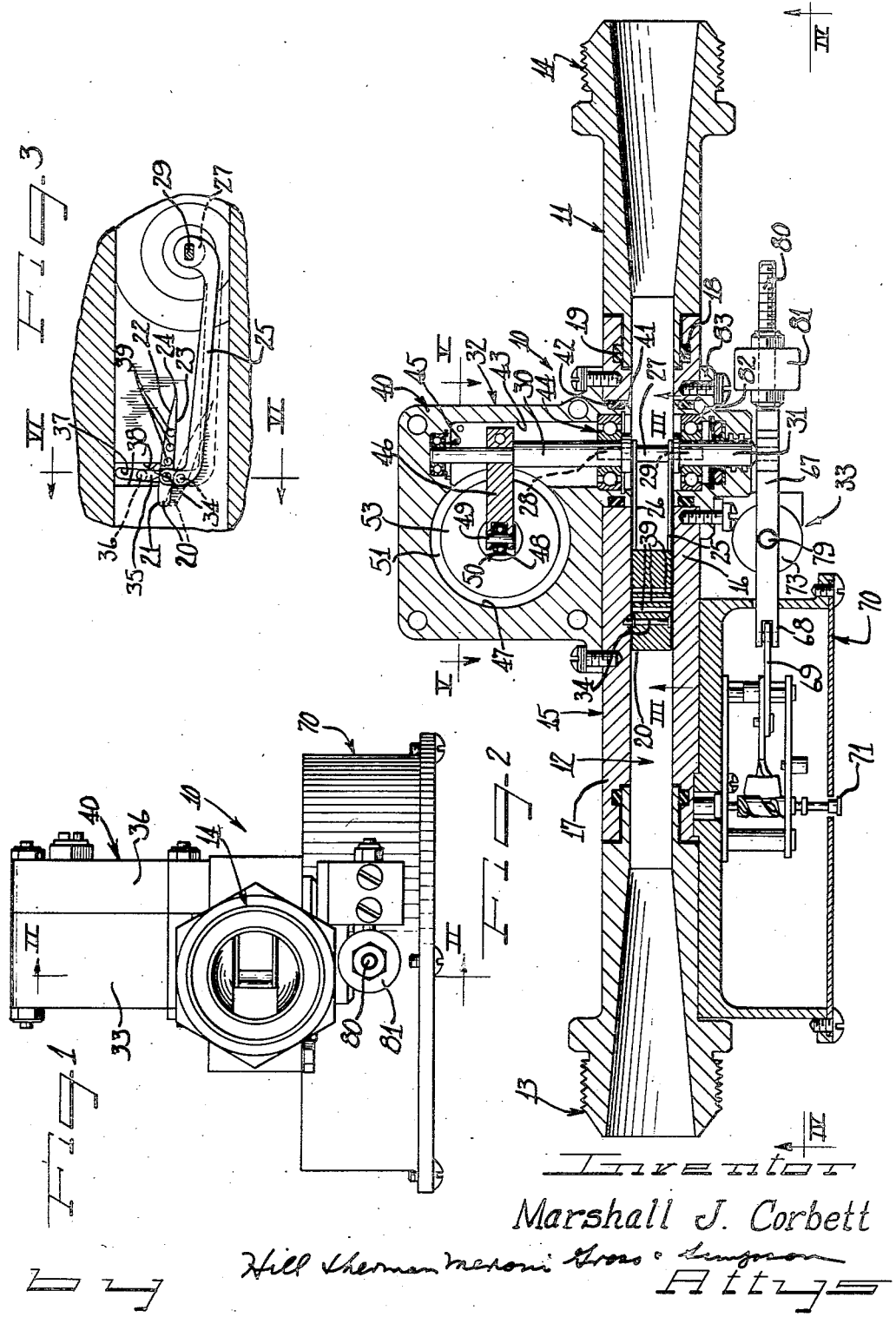

United States Patent Office 2,800,020
Patented July 23, 1957

2,800,020

FLOWMETER

Marshall J. Corbett, Mayfield Heights, Ohio, assignor to Thompson Products, Inc., Cleveland, Ohio, a corporation of Ohio Application April 30, 1954, Serial No. 426,845

2 Claims. (Cl. 73—228)

This invention relates to an apparatus for measuring flow of fluids and more particularly to an apparatus for measuring flow of fluids in which an aerofoil section is supported in the path of flow and in which the force exerted by the fluid tending to move the aerofoil section in a direction transverse to the flow is measured.

The aerofoil section may be any body on which fluid will exert a force transverse to the flow direction but preferably it should be so shaped that the fluid will exert a large transverse force relative to the frictional drag and energy loss produced from the section. Hence the shapes ordinarily employed in airplane wings and the like are suitable and most preferably, the aerofoil section is relatively thin with a rounded forward edge and symmetrically related opposite surfaces extending smoothly from such rounded forward edge and gradually converged to a sharp rearward edge.

The aerofoil section may be supported in a path of fluid flow, which may preferably have a generally rectangular cross-section, by a pair of arms which rotate about a center downstream of the aerofoil section, the arms being preferably located closely adjacent the sides of the rectangular flow path so as to have a minimum effect on flow. The force exerted on the aerofoil section and hence the fluid flow may be measured by measuring the torque exerted on the arms supporting the aerofoil section and this torque may, in turn, be measured by measuring the displacement of the arms against the action of gravity and/or a resisting spring.

According to an important feature of this invention, a linear relation is obtained between velocity (or volume or weight) of fluid flow and the displacement of the aerofoil section, despite the fact that the force exerted on an aerofoil section transverse to the flow is a function of the square of the velocity of flow, and it has been found that inaccuracies which might otherwise develop from squaring of inherent errors are obviated and also there is no necessity for using special complex measuring means response to the square of displacement.

Expressed mathematically, the force exerted on an aerofoil section is given by the following formula:

$$L = C_L \tfrac{1}{2} P V^2 S$$

where L is the force exerted on the aerofoil section transverse to the flow, $C_L$ is a coefficient determined by the shape and size of the section and the angle of attack, P is the fluid density in slugs per cubic feet, V is the fluid velocity in feet per second and S is the plan form area of the section.

The fluid weight flow, of course, is proportional to velocity, given by the following formula:

$$W = PAV \text{ or } V = \frac{W}{PA}$$

where A is the flow channel cross-sectioal area in square feet. By combining these formulas, the following formula is obtained, giving the relation between force and fluid weight flow:

$$L = \frac{C_L W^2 S}{2 P A^2}$$

Hence the transverse force is normally proportional both to the square of the velocity of fluid flow and to the square of the fluid weight flow.

A linear relation between the displacement of the aerofoil section and the velocity or weight flow might be obtained by use of special springs opposing displacement of a section with a force equal to the square of displacement. Preferably, however, and in accordance with a specific feature of this invention, the coefficient $C_L$ is varied in a manner such that the force L is directly proportional to velocity or fluid weight flow. This may most preferably be accomplished by varying the angle of attack of the aerofoil section. In particular, the angle of attack may be made inversely proportional to displacement with the aerofoil section used in a range where the coefficient $C_L$ is proportional to the angle of attack and with the resisting spring applying a force proportional to displacement as is the usual spring action. Accordingly, the coefficient $C_L$ will be inversely proportional to the force L; expressed mathematically by the following formula:

$$C_L = \frac{C_x}{L}$$

where $C_x$ is a coefficient determined by the shape and dimensions of the section, etc. Substituting in the above formula, $$L = \frac{C_x W^2 S}{L 2 P A^2}$$

and $$L^2 = \frac{C_x W^2 S}{2 P A^2}$$

Taking the square root of both sides, $$L = \frac{W}{A} \sqrt{\frac{C_x S}{2P}}$$

Hence the force on the aerofoil section and the displacement of the section, which is directly proportional to the force, are directly proportional to the fluid weight of flow.

The angle of attack of the aerofoil section might be automatically reduced by supporting the section for pivotal movement about an axis spaced upstream therefrom. Preferably, however, and in accordance with a further specific feature of the invention, the support arms are pivoted about an axis downstream from the aerofoil section, the aerofoil section is pivotally carried by the support arms, and the cam and cam follower means are provided between the aerofoil section and the walls of the fluid flow pass for decreasing the angle of attack of the aerofoil section as the displacement is increased. Preferably, an arm carried by the aerofoil section carries a cam follower engaged in a cam slot in one wall of the flow passage.

With this arrangement, it is possible to obtain a displacement directly proportional to flow within very close tolerances. Also, the section can be located a relatively great distance from the axis of the support arm so that sufficient torque is developed to make negligible any frictional forces in the bearing means, etc.

According to another specific feature of the invention, the aerofoil section may be supported for pivotal movement about an axis about which the flow-induced forces tending to move the section transverse to the flow are balanced.

According to a further specific feature of the invention, the aerofoil section is pivotal about an axis through the center of gravity thereof, which may be accomplished by drilling holes in the section.

With these arrangements, the loading on the cam and cam follower means for tilting of the aerofoil section is reduced to a minimum, and the forces of gravity can have no effect on the tilting of the aerofoil section.

Still another feature of the invention is in the pivoting of the support arms for the aerofoil section about an axis about which drag forces, that is, forces parallel to the flow, on the arm means and on the aerofoil section are balanced.

A still further specific feature of the invention is in the provision of counterweight means balancing the arm means together with the aerofoil section about the pivotal axis of the arm means, so that gravity can have no effect on the operation of the instrument.

Yet another feature of the invention is in the provision of adjustable dash-pot means connected to the arm means supporting the aerofoil section.

An object of this invention, accordingly, is to provide an improved apparatus for measuring flow.

Another object of this invention is to provide an improved apparatus for measuring flow by which the displacement of an indicator is directly proportional to the velocity, or rate of flow.

A further object of this invention is to provide an improved apparatus for measuring the flow in which an aerofoil section is supported in the path of fluid flow and the force tending to move the section in a direction transverse to the flow is measured.

Still another object of this invention is to provide an improved apparatus for measuring flow in which an aerofoil section is supported in the path of fluid flow to be displaced by the flow against the action of resisting spring means, with the angle of attack of the aerofoil section being automatically reduced as the displacement is increased.

This invention contemplates other and more specific objects, features and advantages which will become more fully apparent from the following detailed description taken in conjunction with the accompanying drawings which illustrate a preferred embodiment and in which:

Figure 1 is a side view of a flow meter constructed according to the principles of this invention;

Figure 2 is a sectional view taken substantially along lines II—II of Figure 1;

Figure 3 is an enlarged detail view taken substantially along lines III—III of Figure 2;

Figure 4 is a sectional view taken substantially along lines IV—IV of Figure 2;

Figure 5 is a sectional view taken substantially along lines V—V of Figure 2, and Figure 6 is a sectional view taken substantially along lines VI—VI of Figure 3.

Reference numeral 10 generally designates a flow meter constructed according to the principles of this invention which may comprise a housing 11 defining a fluid flow path 12 and having externally threaded end portions 13 and 14 for connection of the device in a fluid flow system and an intermediate portion 15. The cross-section of the fluid flow path 12 at the end portions 13 and 14 of housing 11 may be circular but may be gradually changed to a rectangular cross-section at the intermediate portion 15 of the housing which may have removable side plates 16 and 17 bolted or otherwise secured thereto with gaskets 18 and 19 to prevent fluid leakage. It may, at this point, be noted that the device may be utilized to measure the flow of either liquids or gases but is particularly designed for the measurement of the flow of liquids and has been used as a fluid flow measuring and regulating device in jet engine main and after burner fuel system.

Supported in the rectangular intermediate portion of the fluid flow path 12 is an aerofoil section 20 arranged to be displaced transversely to the direction of flow in proportion to the velocity, volume or weight of flow per unit time. The aerofoil section 20 may most preferably, as illustrated, have a rounded forward edge 21 and symmetrically related opposite surfaces 22 and 23 extending smoothly from the rounded forward edge 21 and gradually converged to a sharp rearward edge 24. The section 20 is supported at an angle to the direction of flow, which angle is hereinafter referred to as the "angle of attack," so that the fluid will act to displace the section 20 in a direction transverse to the flow, in accordance with well known aerodynamic theory.

The section 20 may most preferably be supported by a pair of arms 25 and 26 extending along the inner surfaces of the side plates 16 and 17, respectively, and secured to a shaft 27 pivotal on an axis downstream from the aerofoil section 20. The shaft 27 may have end portions 28 and 29 of generally rectangular cross-section fitted into similarly shaped recesses in shafts 30 and 31, respectively. The shaft 30 may be coupled to an adjustable dash pot device generally designated by a reference numeral 32 and the shaft 31 may be connected to a mechanism for indicating angular displacement thereof, as will be described in detail hereinafter.

As discussed in detail in the foregoing preliminary discussion, the aerofoil section 20 may be pivoted to decrease the angle of attack thereof in direct proportion to displacement. For this purpose, the section 20 may most preferably be secured to a pin 34 having ends journaled in apertures in the end portions of the arms 25 and 26. One end of the pin 34 may carry an arm 35, the outer end of the arm 35 having an outwardly projecting portion 36 defining a cam follower and engaged in a slot 37 in the inner surface of removable side plate 17 of the intermediate portion 15 of the housing 11. The inner surface of the side plate 17 may be relieved on either side of the slot 37, as indicated by reference numeral 38, to provide clearance for the arm 35 in all positions of the section 20.

The aerofoil section 20 is illustrated in an intermediate position in Figure 3 and the cam slot 37 is curved, as illustrated, so that when the arms 25 and 26 are rotated counter-clockwise from the position as illustrated in Figure 3, the angle of attack of the aerofoil section 20 to the direction of flow will be increased, and might ultimately reach a position as illustrated in dotted lines in Figure 3, while with clockwise movement of the arms 25 and 26, the angle of attack of the section 20 to the flow will be decreased. Initially, with no flow, the aerofoil section 20 will, of course, be in the position illustrated in dotted lines in Figure 3 and with increasing flow the aerofoil section 20 will be displaced toward the full line position of Figure 3 with the angle of attack being reduced in proportion to displacement. As heretofore explained, by so reducing the angle of attack of the aerofoil section 20, a linear relation is obtained between the displacement and the velocity or volume or weight rate of flow.

According to a specific feature of the invention, the axis of the pin 34 supporting the aerofoil section 20 is such that the flow-induced forces causing displacement of the section 20 transverse to the flow are balanced about the axis of the pin 34. For this purpose, the axis of the pin 34 should be approximately one-fourth of the distance from the rounded forward end 21 to the sharp rearward end 24.

According to a further specific feature of the invention, the axis of the pin 34 should extend through the center of gravity of the aerofoil section 20 so that the gravitational forces will be balanced and so that the device may be actuated in any position. For this purpose, holes 39 may be drilled through the aerofoil section 20 behind the pin 34.

It will be appreciated that by so balancing the aerofoil section 20 with respect to flow-induced forces and with respect to gravitational forces, the loading on the cam follower 36 is reduced to a minimum.

According to still another feature of the invention, the axis of the shaft 27, which, of course, supports the arms 25 and 26, is so located that movements about this axis caused by fluid drag on the aerofoil section 20 and the arms 25 and 26 is reduced to a minimum. For this purpose, the shaft 27 should be located with its axis as illustrated in Figure 3.

As previously noted, the shaft 30, which is keyed to the shaft 27, is coupled to an adjustable dash-pot generally designated by reference numeral 32. This adjustable dash-pot assembly 32 may comprise a housing 40 bolted to the side plate 17 of the main housing 11 and having a sleeve-like projecting portion 41 engaged in an aperture in the side wall 17 concentric with the shafts 27 and 30. A suitable O-ring may prevent fluid leakage through such aperture in the side wall or plate 17. The shaft 30 is journaled for rotation within a generally cylindrical chamber 43 in the housing 40 by bearing means generally designated by reference numerals 44 and 45. Intermediate its ends, the shaft 30 carries an arm 46 which projects into a chamber 47 and which has a bifurcated end portion receiving the end of a lug 48 and pivotally connected thereto through a pin 49, ball bearing means 50 being preferably provided to reduce friction.

The lug 48 may have a threaded shank portion extending through a diaphragm 51 with clamping plates 52 and 53 on such shank portion of the lug 48 on opposite sides of the diaphragm 51, the plates 52 and 53 being urged together by a nut 54 threaded onto the shank portion of the lug 48.

The housing 40 may be of a two-piece construction including a first member 55 defining the chambers 43 and 47 and a second member 56 defining a chamber 57 in facing relation to the chamber 47, the peripheral edge of the diaphragm 51 being clamped between the members 55 and 56. A coiled compression spring 58 may be disposed within the chamber 57 to act against the diaphragm 51.

The chambers 47 and 57 may be filled with a suitable damping fluid medium with the damping action on the shaft 30 controlled by controlling flow of fluid from one chamber to the other. For this purpose, the part 56 of the housing 40 may have a passage 59 extending from the chamber 57 to a chamber 60 in the part 56, the chamber 60 being in communication with the chamber 43 in the part 55 through a passage 61. A needle valve member 62 has a threaded shank portion 64 adjustably extending into the passage 61 to control the flow of fluid between the chamber 57 and the chamber 47, to thereby control damping of the shaft 30. Suitable sealing means such as an O-ring 65 may be disposed about the needle valve member 62, and a lock nut 66 may be provided to fix the position of the needle valve member 62 when the desired adjustment is obtained.

As briefly indicated above, the shaft 31 drives an indicating mechanism generally designated by reference numeral 33. In more detail, an arm 67 may be rigidly fixed to the end of the shaft 31 and may have a bifurcated end portion 68 coupled to an actuating lever 69 of an indicator gauge generally designated by reference numeral 70 which may have a pointer shaft 71 rotated through an angle equal to a predetermined multiple of the angle of rotation of the lever 69. The gauge 70 may take any of the forms well known in the art, and, in itself, forms no part of the present invention, and for those reasons, it will not be described in detail.

Clockwise rotation of the arm 67 is illustrated in Figure 4, and hence clockwise rotation of the arms 25 and 26 as illustrated in Figure 3, is opposed by means of a coiled compression spring 72 disposed within a generally cylindrical housing 73 and acting in compression against a washer 74 which is adjustably clamped by means of nuts 75 and 76 on a pin 77 extending through an aperture 78 in the lever 67 with relative movement between the lever 67 and the pin 77 being prevented by an enlarged segmental spherical end portion 79 of the pin 77. This provides for limited universal movement, and prevents any binding action between the pin 77 and the arm 67.

To balance the shaft 27 and all parts connected thereto, the arm 67 has a threaded end portion 80 on which a counterweight 81 is threaded.

It may be noted that the shaft 31 is journaled by means of a bearing assembly 82 in the housing member 83 bolted to the side plate 16 of the housing 11. This housing member 83 may carry the housing 73 for the coiled compression spring 72.

From the foregoing, it will be apparent that this invention provides apparatus for measuring the flow of fluids which is comparatively simple and yet very accurate, reliable and efficient. It will further be apparent that the flow meter may be readily and economically manufactured from a minimum number of parts and yet is very rugged and durable.

It will, of course, be understood that modifications and variations may be effected without departing from the spirit and scope of the novel concepts of the present invention.

I claim as my invention:

1. In a flow meter, housing means arranged to define a fluid flow path, an aerofoil section, means arranged for supporting said section in said path for displacement in one direction transverse to the flow under the influence of flow and for relative pivotal movement to vary the angle of attack to the flow, spring means arranged to oppose movement of said section in said one direction with a force proportional to displacement, and cam and cam follower means acting between said section and said housing means and arranged to pivot said section to reduce the angle of attack as displacement in said one direction is increased.

2. In a flow meter, housing means arranged to define a fluid flow path, an aerofoil section, means arranged for supporting said section in said path for displacement in one direction transverse to the flow under the influence of flow and for relative pivotal movement to vary the angle of attack to the flow, spring means arranged to oppose movement of said section in said one direction with a force proportional to displacement, an arm carried by said section, and a cam follower on said arm, one of said walls having a cam slot receiving said cam follower and arranged for pivoting said section to reduce the angle of attack as displacement in said direction is increased.

References Cited in the file of this patent

UNITED STATES PATENTS

| | | |
|---|---|---|
| 529,191 | Recknagel | Nov. 13, 1894 |
| 2,331,304 | Carmody | Oct. 12, 1943 |
| 2,716,889 | Doman | Sept. 6, 1955 |

FOREIGN PATENTS

| | | |
|---|---|---|
| 451,295 | Great Britain | Aug. 4, 1936 |
| 687,354 | Germany | Jan. 29, 1940 |
| 221,043 | Switzerland | May 15, 1942 |